Oct. 23, 1962  H. H. KOOPMAN  3,059,726
VEHICLE LIFT

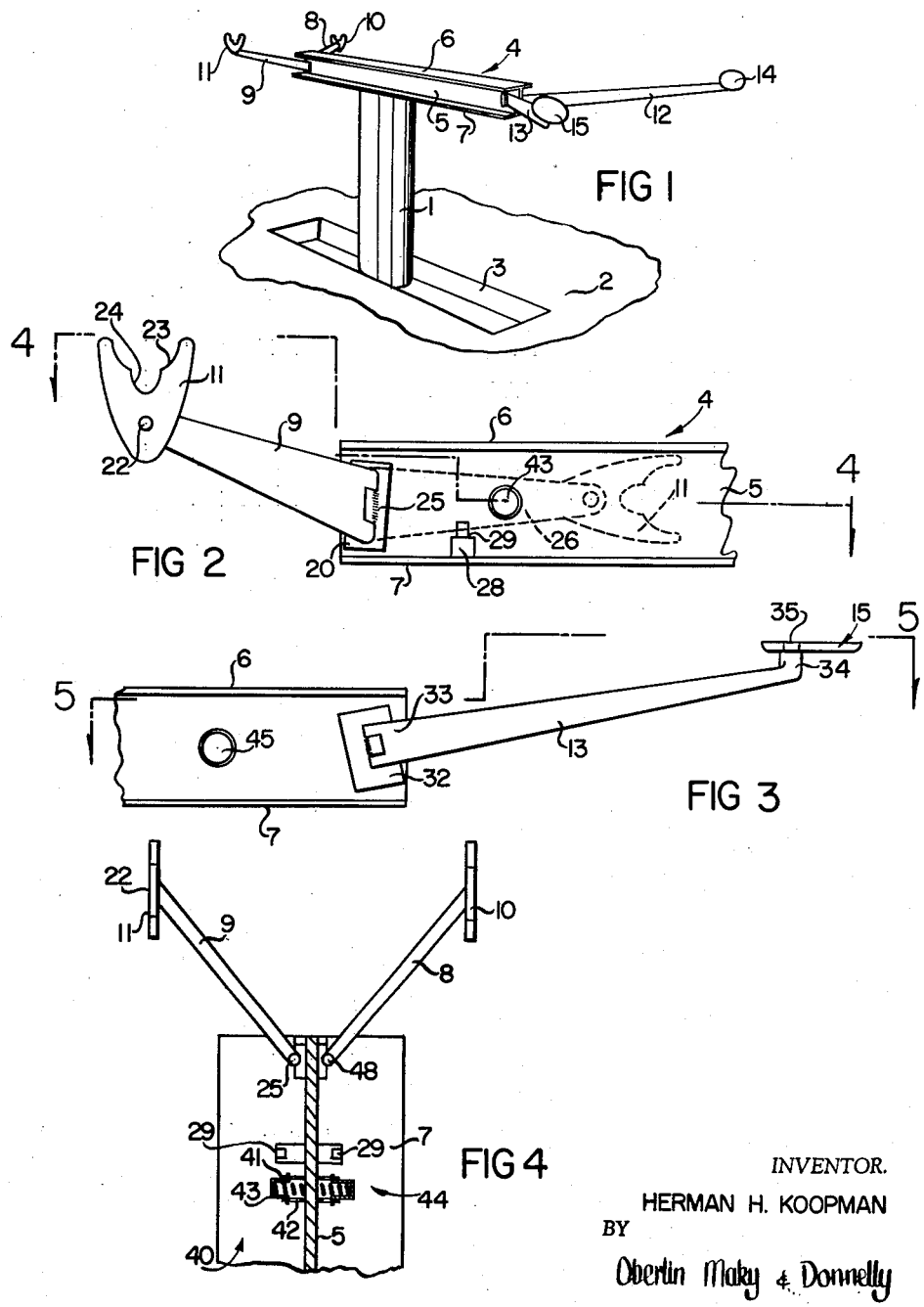

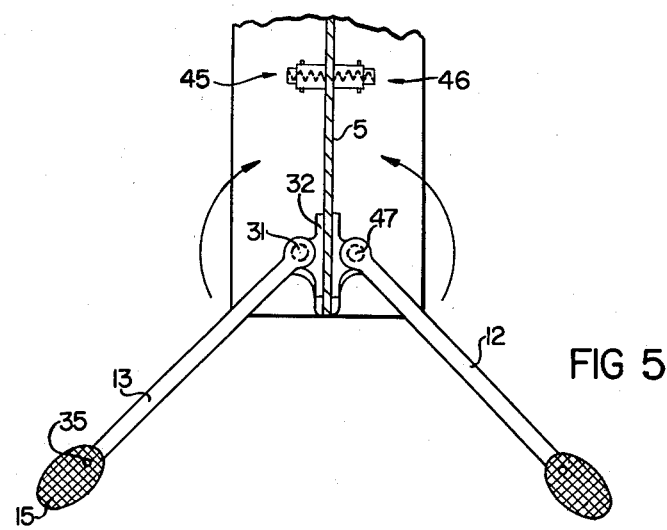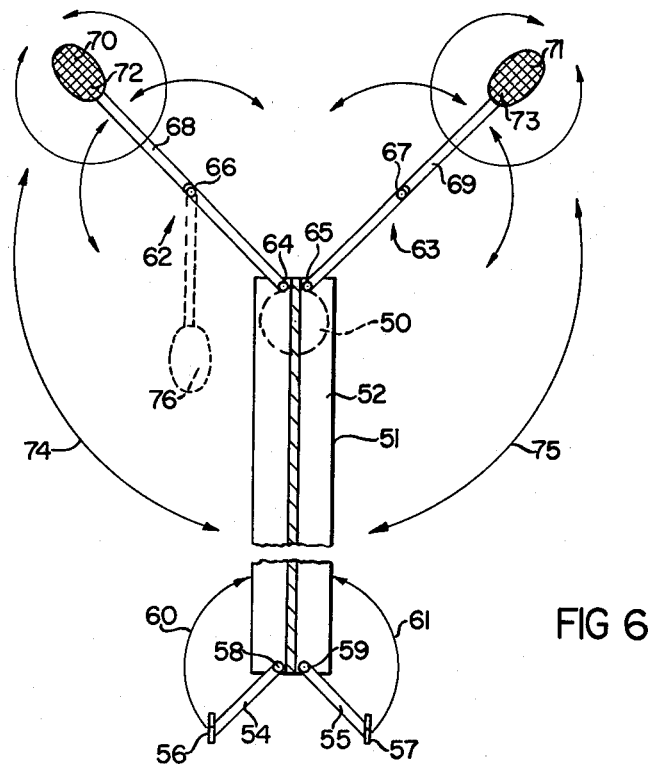

Filed Feb. 1, 1961  3 Sheets-Sheet 3

INVENTOR.
HERMAN H. KOOPMAN
BY
Oberlin, Maky & Donnelly
ATTORNEYS

United States Patent Office 3,059,726
Patented Oct. 23, 1962

3,059,726
VEHICLE LIFT
Herman H. Koopman, Cleveland Heights, Ohio, assignor to The Standard Oil Company, Cleveland, Ohio, a corporation of Ohio
Filed Feb. 1, 1961, Ser. No. 86,544
10 Claims. (Cl. 187—8.75)

This invention relates generally, as indicated, to a vehicle lift and more particularly to an automobile hoist adapted for use in a service station and the like.

There are three basic types of automobile lifts employed in service stations today, these being the roll on type, the two post variety, and the frame pick-up, with each having faults peculiar to its particular design. None incorporates all of the desirable features of, for example, free wheeling in the raised position, easy positioning, undercar accessibility, adaptability to varied wheel bases, and low cost of manufacture.

Moreover, prior automobile lifts create potential hazards in service stations since conventional lifts in their lowermost positions usually protrude above the service station floors and thus present obstructions over which an attendant or customer is very apt to trip. A service station and the equipment therein should be neatly arranged, easily accessible and functional, and only with these factors can accidents be kept at a minimum. It therefore would be desirable to obtain these features in a low cost automobile lift.

It is accordingly a principal object of the present invention to provide a neat, functional and safe automobile lift which can be manufactured at a low cost.

It is another principal object to provide an automobile lift which will provide substantially complete undercar accessibility.

It is still another principal object to provide an automobile lift readily adaptable to varied wheel bases and frame sizes.

It is yet another principal object to provide an automobile lift in which all of the automobile wheels can readily be rotated in the lifted position.

It is another object to provide an automobile lift in which the vehicle engaging portions thereof can easily be positioned.

It is still another object to provide an automobile lift incorporating the above objects which can be recessed into the floor of a service station to present a completely unobstructed floor when such lift is not in use.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

In said annexed drawings:

FIG. 1 is a perspective view of an automobile lift in accordance with the present invention shown in its raised vehicle lifting position;

FIG. 2 is a fragmentary side elevational view of such lift mechanism illustrating a support arm for the rear of a vehicle in extended position;

FIG. 3 is a view similar to FIG. 2 illustrating a vehicle front support arm in extended position;

FIG. 4 is a horizontal section taken substantially on the line 4—4 of FIG. 2;

FIG. 5 is a horizontal section also taken substantially on the line 5—5 of FIG. 3;

FIG. 6 is a top plan view, partially in section, of an alternative form of lift in accordance with the present invention;

Figure 7:
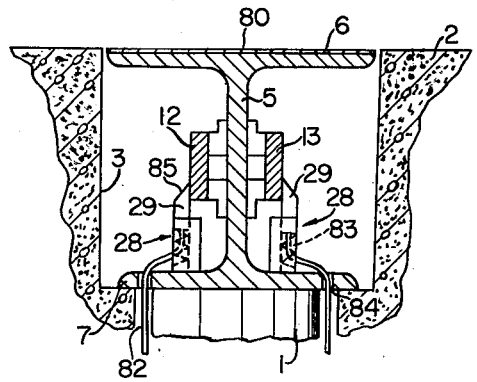
FIG. 7 is a fragmentary vertical section of a lift in accordance with the present invention in its recessed or lowered position and illustrating one form of latch and control mechanism that may be employed therewith.

Referring now to said annexed drawings and more particularly to FIG. 1, the vehicle lift in accordance with the present invention is shown in its elevated position with the vehicle supporting arms thereof in extended position. Such lift includes a conventional right circular cylindrical lifting ram 1 extending from the floor 2 of the service station from within a recess or pit 3 and such cylinder has mounted thereon by suitable means, such as bolts, a simple I-beam frame 4. Such I-beam frame 4 includes the vertically extending web portion 5, a top flange 6 and a bottom flange 7, with such bottom flange 7 being mounted directly on the top of the ram 1.

Hingedly secured to opposite sides of the web 5 at the rear of the frame are two vehicle engaging arms 8 and 9 provided with horizontally pivotal vehicle engaging members 10 and 11 at the distal ends thereof. Similarly, at the front or opposite end of the frame, two vehicle engaging arms 12 and 13 are hinged to opposite sides of the web 5 and such arms are also provided with vehicle engaging members or pads 14 and 15 at the distal ends thereof.

Referring now more particularly to FIGS. 2 through 5, it will be seen that the arm 9 for the rear of the automobile is hinged or pivoted to the web portion of the frame 4 on a slightly inclined axis whereby such arm will move between the flanges 6 and 7 of the frame 4 in a collapsed or retracted position against the web, and an extended position in which the end of the arm is above the top flange 6. The hinge pivot for this rearwardly extending arm may thus be provided on a slightly inwardly inclined axis by means of a hinge plate member 20 welded or otherwise secured to the side of web 5 and a pivot pin engaged in such member with a clevis end of the arm 9. The member 11 which is adapted more particularly to engage the rear axle of a vehicle laterally adjacent a centrally located rear differential of the same is provided with a pivot 22 at the distal end of arm 9. In this manner, the member 11 may be pivoted from the vertical vehicle engaging position shown in the full lines to a horizontal position in which it will readily fit between the flanges 6 and 7 when the arm is retracted as aforesaid. Such member 11 is provided with a top recess 23 as shown readily adapting the same to engage the rear axle. The recess 23 thus provides a saddle for the rear axle of an automobile and the further inner recess 24 may be employed for a smaller size axle, for example.

Inclined pivot 25 provided between the proximal end of the arm 9 and the plate 20 welded to the web 5 then permits the arm 9 to be pivoted from the full line extended position to the dotted line collapsed position shown at 26. In this position, the vehicle engaging member 11 will be pivoted about pivot 22 to lie in the generally horizontally extending position within the recess provided by the top flange 6 and the bottom flange 7. A latching mechanism 28 is here employed to hold such arm 9 in this collapsed position. Such latch mechanism includes a spring loaded dog 29 having a beveled arm engaging surface effective to move the dog downwardly against the spring pressure to snap over the outside of the arm to hold it in recessed position.

Referring now more particularly to FIGS. 3 and 5, the vehicle supporting arm 13 is pivoted to the web 5 on an inwardly inclined axis 31 by means of pivot plate 32. Such plate 32 provides an inclined pivot for the clevised proximal end 33 of the arm 13. The distal end of arm 13 is provided with an outwardly extending portion 34 providing a vertical pivot 35 for frame contacting pad or plate 15. Instead of the vertical axis pivot illustrated, it will be understood that a ball and socket connection can be provided between the arm 13 and the frame contacting pad 15 whereby the top surface of such frame contacting member can be angularly inclined.

As shown in FIG. 4, the arm 9 is provided with a push spring mechanism generally shown at 40. Such mechanism comprises a compression spring 41 within a housing 42, such spring having a cap 43 thereon movable within such housing 42. Thus, when the arm 9 is pivoted to its collapsed position extending generally parallel to the web 5, the spring 41 will be compressed such that the cap 43 and housing 42 will be substantially co-extensive. In such position parallel to the web 5, the latch mechanism 29 will snap over the exterior of the arm to hold the same in the collapsed position. It can then be seen that when the latch is released by controls hereinafter described, the push spring mechanism 40 will assist in swinging the arm 9 outwardly about its pivot 25. Similarly, a push spring mechanism 44 will be provided for arm 8, as also shown in FIG. 4 and push spring mechanisms 45 and 46 are provided for arms 13 and 12 respectively as shown in FIG. 5. The arm 12 is pivoted to the web 5 by inclined pivot 47 in a manner identical to the pivot 31 of arm 13, while arm 8 is pivoted to the web 5 by inclined pivot 48 similarly as arm 9. The pivots for the four arms will be sufficiently stiff that they will remain in the positions in which the attendant places them prior to the raising of the frame 4 to contact the under-carriage or frame of a vehicle. Preferably, the top surfaces of the pad members on the ends of arms 12 and 13 will be knurled or otherwise roughened to preclude the same from slipping from the frame of an automobile.

Referring now to FIG. 6, there is illustrated a further embodiment of the present invention which is designed specifically for employment with small or compact cars. The ram 50 is secured to frame 51 in the form of an I-beam having flanges 52 connected by a web 53. At the rear of such frame, a pair of relatively short arms 54 and 55 are provided having vehicle contact members 56 and 57 thereon. Such contact members may provide a saddle for the rear axle, or in automobiles having engines mounted in the rear and thus no rear axle with a differential, such contact members 56 and 57 can readily be adapted to engage the frame of the car at the rear thereof. The pivots 58 and 59 for arms 54 and 55 will be slightly inclined such that the arms can be folded to lie parallel to the web 53 as indicated by arrows 60 and 61. Latches and push springs as in the FIGS. 1–5 embodiment will, of course, also be provided.

Arms 62 and 63 pivoted at 64 and 65 to the front portion of the frame 51 are each articulated by an intermediate pivot as shown at 66 and 67. The outer sections 68 and 69 of such arms are provided with the frame contacting pads 70 and 71 respectively which are pivoted thereto as shown at 72 and 73. The arrows shown in connection with the arms 62 and 63 then indicate the various positions that may be obtained for the pads 70 and 71 and it will readily be understood that the pads 70 and 71 can be adjustably positioned about pivots 64 and 65 as shown by the arrows 74 and 75. Thus the outer arm sections 68 and 69 may be bent about pivots 66 and 67 to position the pads 70 and 71 relatively close to the frame 51 if desired as shown by the dashed line position at 76.

Figure 8:
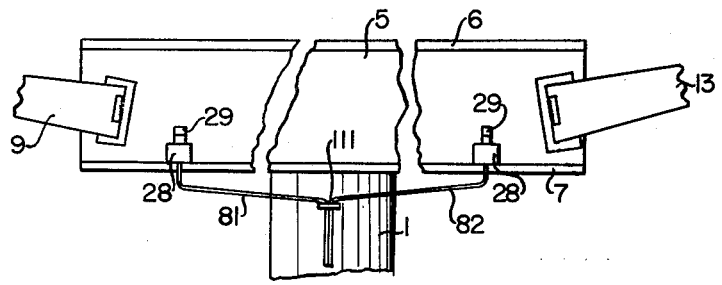
FIG. 8 is a side elevation of such lift showing the latch mechanism of FIG. 7.

Referring now to FIGS. 7 and 8, there is illustrated one form of latching and control mechanism for employment with such vehicle hoist. In FIG. 7, the frame 4 is shown in its recessed position within the recess 3 in floor 2. The ram 1 is then withdrawn downwardly to the position shown. The frame 4 will preferably be provided with a top coating or surface 80 of an anti-skid material and it is noted that such top surface closely corresponds to the surface of floor 2 such that no obstructions are presented by the vehicle lift in its inoperative position. In the FIG. 7 embodiment, the arms 12 and 13 are shown in their collapsed position generally parallel to the web 5 and in such position, they are held by the latch mechanisms 28. In such positions, the push spring mechanisms 45 and 46 will be compressed between the arms and the web 5.

The latching mechanisms 28 may be operated by pull cables 81 and 82 to release latching dogs 29 by pulling the same downwardly against the pressure of springs 83. The cables 82 may extend through apertures 84 in the bottom flange 7 and it will be understood that such cables will extend to a control board or the like conveniently positioned for the vehicle lift operator.

The ram 1 may be actuated in a conventional manner by the use of pneumatic controls and the pull cables 81 and 82 may be conveniently placed therewith. It will also be understood that electrically or more particularly solenoid controlled latching mechanisms may be employed.

With the vehicle lift in the recessed position within the concrete floor as shown in FIG. 7, an automobile will be driven thereover and when the rear wheels of the car are cradled in a slight recess or stationary wheel chocks or the like, the rear axle of such automobile will automatically be centered for the rear axle saddle provided by the vehicle engaging members 10 and 11 of the arms 8 and 9. The lift will be raised slightly by the operator so that the arms 8, 9, 12 and 13 will clear the top of floor 2 and the further upward movement of the lift will be stopped. The latching dogs 29 will be pulled downwardly by cables 82 and 83 and the arms will be caused automatically to swing outwardly by the spring mechanisms 45, 46, etc. Stops may be provided for the arms so that they may automatically be positioned in the desired location although the operator will generally be required to position at least the front vehicle contacting pads in the desired position. When so positioned, further upward movement of the ram will raise the vehicle.

In lowering the vehicle, the operator will lower the ram until the vehicle engaging portions of the arms are free of the vehicle and the arms can then be pushed inwardly against the web 5 of the beam until the lower edge of the arms engages the beveled top surface 85 of the latching dogs 29 pushing the dogs downwardly against the springs 83 causing the arms automatically to be latched when in parallelism with the web 5. With the arms and pads in latched position, the ram may be caused further to descend to place the left in the recessed position shown more clearly in FIG. 7.

It can now be seen that a vehicle lift is provided giving maximum undercar accessibility at the front where most of the services performed in service stations, such as front wheel greasing, oil and transmission draining, are performed. Also, the rear differential is made easily accessible by the swing angle of the rear axle saddle. The single I-beam lift offers excellent accessibility for muffler and tailpipe service and the free-wheeling available for the wheels makes possible the best tire service. This free-wheeling also permits improved lubrication by relaxing the wheels thus allowing the grease more fully to penetrate all wear surfaces.

Other modes of applying the principles of the invention may be employed, change being made as regards the details described, provided the features stated in any of the following claims or the equivalents of such be employed.

I, therefore, particularly point out and distinctly claim as my invention:

1. In a vehicle lift, a horizontally extending beam having a generally flat top portion and a vertical portion depending therefrom substantially at the longitudinal centerline of the top portion, vehicle supporting arms pivoted to the vertical portion of said beam on inclined axes for swinging movement of said arms between collapsed positions against the vertical portion and extended positions wherein the distal ends of said arms are disposed above the top portion of the beam.

2. A vehicle lift as set forth in claim 1 including vehicle contacting members adjustably mounted on the distal ends of said arms.

3. A vehicle lift as set forth in claim 1 wherein said vehicle supporting arms include a pair of relatively short arms pivoted to opposite sides of said vertical portion at one end thereof adapted to provide a saddle for a vehicle rear axle and the like and a pair of relatively long arms pivoted to opposite sides of said web at the other end adapted to support a frame portion of such vehicle, the length of said beam being at least as long as the combined length of such a short and a long arm.

4. A vehicle lift as set forth in claim 1 including latch means to hold said arms in collapsed position within the periphery of the top portion of said beam.

5. A vehicle lift as set forth in claim 1 including spring means to urge said arms outwardly from their collapsed positions to aid in properly positioning said arms beneath a vehicle and the like.

6. In a vehicle lift, the combination of a frame member having a planar top surface and a floor having a pit therein corresponding to said planar top surface, means supporting said frame member for vertical movement with respect to said floor, arms pivoted to said frame member, recesses in said frame member whereby said arms can be pivoted into said recesses and said frame member can then be withdrawn into such pit to expose only said planar top surface.

7. A combination as set forth in claim 6 wherein said frame member comprises an I-beam and said arms are pivoted on axes parallel to the web of said I-beam, with said recesses being defined by the flanges of said I-beam.

8. In a vehicle lift, a frame member having a planar top surface, means supporting said frame member for vertical movement with respect to a floor, arms pivoted to said frame member, recesses in said frame member whereby said arms can be pivoted into said recesses and said frame member can then be withdrawn into such floor to expose only said planar top surface, said frame member comprising an I-beam and said arms being pivoted on axes parallel to the web of said I-beam, with said recesses being defined by the flanges of said I-beam, and vehicle contacting pads on the distal ends of said arms being above the top flange of said I-beam in the extended position of said arms and below said top flange in the collapsed position of said arms.

9. In a vehicle lift, an I-beam frame member, means to raise and lower said frame member, vehicle supporting arms, pivot means connecting the proximal ends of said arms to said frame member for adjustment of the distal ends of said arms between collapsed positions beneath the top flange of said I-beam and extended positions above such top flange.

10. A vehicle lift as set forth in claim 9 wherein at least one of said vehicle supporting arms is intermediately articulated.

References Cited in the file of this patent

FOREIGN PATENTS

| 184,698 | Austria | Feb. 10, 1956 |
| 768,388 | Great Britain | Feb. 13, 1957 |